United States Patent
Kunkat et al.

(10) Patent No.: US 7,412,230 B2
(45) Date of Patent: Aug. 12, 2008

(54) METHOD OF RELEASING COMMUNICATION BETWEEN AT LEAST TWO COMMUNICATION DEVICES

(76) Inventors: Holger Kunkat, Papierfabrikgasse 7, A-8045 Graz (AT); Reinhard Meindl, Uhlirzgasse 5, A-8045 Graz (AT); Stefan Posch, Statteggerstrasse 52/5, A-8045 Graz (AT); Klemens Breitfuss, Floraweg 7, A-8570 Voitsberg (AT); Franz Amtmann, Rechbauerstrasse 15, A-8010 Graz (AT); Peter Thueringer, Am Arlandgrund 29/3/7, A-8045 Graz (AT)

( * ) Notice: Subject to any disclaimer, the term of this patent is extended or adjusted under 35 U.S.C. 154(b) by 42 days.

(21) Appl. No.: 10/507,946

(22) PCT Filed: Feb. 26, 2003

(86) PCT No.: PCT/IB03/00766

§ 371 (c)(1),
(2), (4) Date: Sep. 14, 2004

(87) PCT Pub. No.: WO03/077576

PCT Pub. Date: Sep. 18, 2003

(65) Prior Publication Data

US 2005/0164676 A1 Jul. 28, 2005

(30) Foreign Application Priority Data

Mar. 14, 2002 (EP) .................................. 02100249

(51) Int. Cl.
*H04M 1/66* (2006.01)
*H04M 1/68* (2006.01)
*H04M 3/16* (2006.01)

(52) U.S. Cl. .................... 455/411; 455/41.1; 455/41.2; 455/41.3; 455/450; 380/270; 380/278; 713/169; 713/170

(58) Field of Classification Search ................. 455/411, 455/41.1–41.3, 450; 380/270, 278; 713/169, 713/170
See application file for complete search history.

(56) References Cited

U.S. PATENT DOCUMENTS

| | | | | |
|---|---|---|---|---|
| 5,553,315 A | * | 9/1996 | Sobti et al. | 455/509 |
| 5,613,215 A | * | 3/1997 | Grube et al. | 340/7.22 |
| 5,619,572 A | * | 4/1997 | Sowa | 380/273 |
| 5,825,889 A | * | 10/1998 | Dent | 380/270 |
| 6,047,174 A | * | 4/2000 | Frederick | 455/410 |
| 6,477,384 B2 | * | 11/2002 | Schroderus et al. | 455/500 |
| 2002/0116509 A1 | * | 8/2002 | DeLaHuerga | 709/229 |
| 2002/0123325 A1 | * | 9/2002 | Cooper | 455/411 |
| 2003/0093663 A1 | * | 5/2003 | Walker | 713/150 |
| 2003/0153300 A1 | * | 8/2003 | Nakao | 455/410 |
| 2004/0033784 A1 | * | 2/2004 | Kojima et al. | 455/73 |

* cited by examiner

*Primary Examiner*—William Trost
*Assistant Examiner*—Ariel Balaoing

(57) ABSTRACT

In a method of releasing communication between at least two communication devices (4, 5, 6, 7, 8), a data carrier (36), that is able to be read from in a non-contacting manner and that contains an authorization code (AUC), is brought into the vicinity of communication devices (4, 5, 8) that are to be released, and the authorization code (AUC) is read out in a non-contacting manner by a reading device (21, 22, 25) contained in the relevant communication device (4, 5, 8) and is fed by the reading device (21, 22, 25) to a releasing device (40, 41, 44) that, after analyzing the authorization code (AUC), is responsible for releasing communication between the communication devices (4, 5, 8) to be released.

20 Claims, 2 Drawing Sheets

METHOD OF RELEASING COMMUNICATION BETWEEN AT LEAST TWO COMMUNICATION DEVICES

The invention relates to a method of releasing communication between at least two communication devices that are arranged to communicate with one another.

The invention further relates to a communication device that is intended and arranged to communicate with another communication device that is arranged to be suitable for this purpose.

There are a wide variety of known ways in which a method of the kind mentioned in the first paragraph above may be performed. There is for example a method of this kind that is known in connection with mobile telephones in which the number of another mobile telephone is dialed from a mobile telephone, after which communication between the two mobile telephones is released once the number dialed has been received by the other mobile telephone and the other mobile telephone has been activated.

With all the known methods, there is the problem that it is possible for communication to be released between two communication devices in a way that is more or less insecure, which means that a case may arise where unwanted and non-secure communication can occur between at least two communication devices.

It is an object of the-invention to obviate the possibilities described above in a simple and reliable manner and to provide an improved method and an improved communication device.

To achieve the above-mentioned object, features according to the invention are provided in a method according to the invention, thus enabling a method according to the invention to be characterized as detailed below, namely:

A method of releasing communication between at least two communication devices that are arranged to communicate with one another, wherein a data carrier, that is able to be read from in a non-contacting manner and that contains an authorization code, is brought into the vicinity of at least two such communication devices, and in this way the data carrier that is brought into the vicinity of a given communication device is brought into non-contacting read connection with a reading device that is connected to the given communication device and can be read in a non-contacting manner, wherein the authorization code is read out by each reading device from the data carrier that is in non-contacting read connection with the reading device, wherein a check is performed on the authorization code read out, and wherein the communication devices by whose reading devices the authorization code was read out from the data carrier are released for communication with one another once the authorization code has been read out from the data carrier, the authorization code read out has been checked and a positive result has been received for the check.

To achieve the above-mentioned object, features according to the invention are provided in a communication device according to the invention, thus enabling a communication device according to the invention to be characterized as detailed below, namely:

A communication device that is arranged and intended to communicate with another communication device arranged to be suitable for this purpose and that has a reading device able to read in a non-contacting manner with which a data carrier, that is able to be read from in a non-contacting manner and that contains an authorization code, can be brought into non-contacting read connection, by which reading device the authorization code contained in the data carrier can be read out, which communication device has a releasing device that cooperates with the reading device and is arranged and intended to release the communication device for communication with another communication device once the authorization code has been read out by the reading device and the authorization code has been checked.

By the provision of the features according to the invention it is ensured, in a simple and easily implementable manner, that the release of communication between at least two communication devices can take place only in a secure manner, and hence that a high standard of security is ensured for the release of communication of this kind, thus preventing any unwanted communication between at least two communication devices with a high level of reliability.

In a method according to the invention it has proved advantageous for the features detailed in claim 2 also to be provided. What is thereby achieved is that any desired number of communication devices, which may for example be situated in a single room or in a building that allows direct communication between the communication devices, can be authorized, and thus released, for communication with one another, by means of only a single data carrier by bringing the single data carrier, in succession, into the vicinity of the communication devices that are to be released for communication.

In a method according to the invention, it has further proved highly advantageous if the features detailed in claim 3 are also provided. What is advantageously achieved in this way is that an authorization code can be conveyed to a plurality of separate data carriers from a central point, in which case, following any such conveyance of the authorization code to the plurality of data carriers, each of the data carriers can be brought into the vicinity of a communication device associated with the relevant data carrier, by which means the relevant communication device is authorized and released using the authorization code read out.

In a method according to the invention having the features detailed in claim 3, it has proved particularly advantageous if the features detailed in claim 4 are also provided. What is obtained in this way is particularly high security with regard to the transmission of the authorization code and thus particularly high security for the release of communication between a plurality of communication stations.

In a method as detailed in the above paragraph, it has proved particularly advantageous if what are used as separate data carriers are data carrier modules each housed in a mobile telephone. This makes it possible, in a simple way, for an authorization code to be transmitted from a central point to a plurality of mobile telephones over a mobile telephone transmission channel which is present anyway and, following this, the authorization code transmitted then to be stored in the data carrier module housed in a mobile telephone, after which the stored authorization code can then be transmitted in a non-contacting manner to a communication device associated with the mobile telephone by having the reading device contained in the relevant communication device read out the authorization code in a non-contacting manner. A mobile telephone of this kind having a communication device associated with a data carrier module may be a PC or a laptop or some other communication device.

These and other aspects of the invention are apparent from and will be elucidated with reference to the embodiments described hereinafter, although the invention is not limited to these embodiments.

Figure 1:
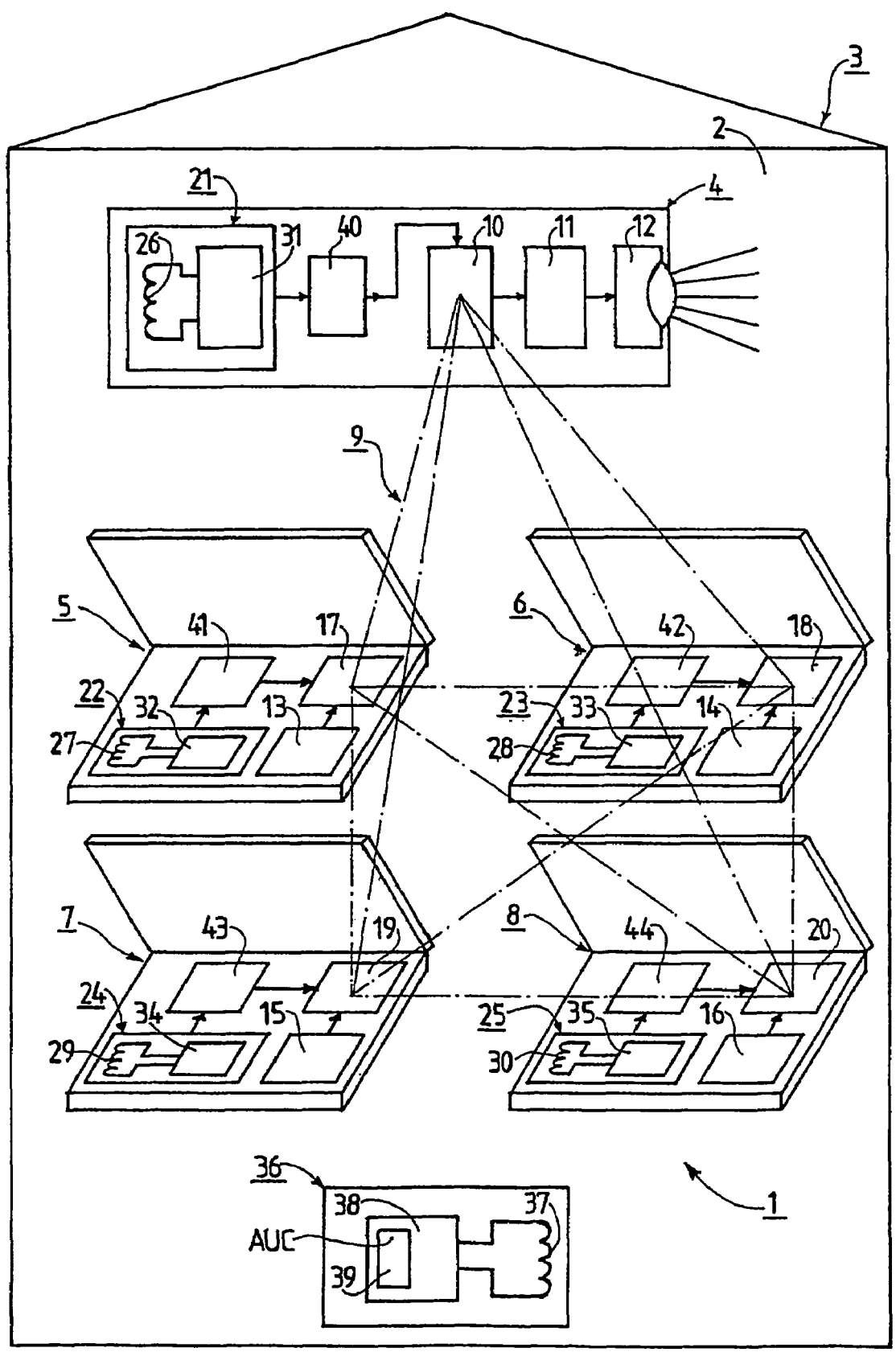
FIG. 1 is a highly diagrammatic view, partly in the form of block circuit diagrams, of a first configuration of communication devices according to the invention.

Shown in FIG. 1 is a first configuration 1 of communication devices. The configuration 1 is accommodated in a room 2 of a building 3.

The configuration 1 contains a first communication device 4 that in the present case is formed by an image projecting device 4. The configuration 1 also contains four further communication devices 5, 6, 7 and 8, these four communication devices 5, 6, 7 and 8 being so-called laptop computers. The total of five communication devices 4, 5, 6, 7 and 8 are arranged and intended to communicate with one another. Communication with one another takes place in the case of the configuration 1 via a wireless local network 9 that is indicated in FIG. 1 by dotted and dashed lines. This wireless local network is a network conforming to IEEE standard 802.11. Any other network suitable for such communication purposes may however be provided in place of this network, such as for example a Bluetooth network or an Ethernet network.

The first communication device 4, or in other words the image projection device 4, contains communication means 10 that are connected to the network 9, and data-processing means 11 connected to the communication means 10, by means of which data-processing means 11 data or data signals received by the communication means 10 can be processed. The first communication device 4 also contains image-reproducing means 12 connected to the data-processing means 11, by means of which image-reproducing means 12 data processed by the data-processing means 11 can be reproduced optically.

The four further communication devices 5, 6, 7 and 8 contain respective data-processing means 13, 14, 15 and 16 by means of which data or data signals contained in the respective communication devices 5, 6, 7 and 8 can be processed. The four further communication devices 5, 6, 7 and 8 also contain respective communication means 17, 18, 19 and 20 that are connected to respective data-processing means 13, 14, 15 and 16. The communication means 17, 18, 19 and 20 are connected to the network 9 to enable mutual communication to take place among all five communication devices 4, 5, 6, 7 and 8 by means of the communication means 17, 18, 19 and 20 and also by means of the communication means 10 of the first communication device 4.

The five communication devices 4, 5, 6, 7 and 8 have respective reading devices 21, 22, 23, 24 and 25 able to read in a non-contacting manner. The reading devices 21, 22, 23, 24 and 25 contain respective read coils 26, 27, 28, 29 and 30 and respective read circuits 31, 32, 33, 34 and 35 connected to respective ones of the read coils.

A data carrier 36 able to be read from in a non-contacting manner can be brought into non-contacting read connection with each of the reading devices 21, 22, 23, 24 and 25. The data carrier 36 contains a transmitting coil 37 and a transmitting circuit 38 connected to the transmitting coil 37. The transmitting circuit 38 contains a memory 39, in which memory 39 an authorization code AUC is stored. The authorization code AUC contained in the data carrier 36 can be read by each of the five reading devices 21, 22, 23, 24 and 25.

The total of five communication devices 4, 5, 6, 7 and 8 contain respective releasing devices 40, 41, 42, 43 and 44 that are connected to respective reading devices 21, 22, 23, 24 and 25. The releasing devices 40, 41, 42, 43 and 44 cooperate with the reading devices 21, 22, 23, 24 and 25 respectively connected to them by virtue of the fact that the authorization code AUC read out from the data carrier 36 by one of the reading devices 21, 22, 23, 24 and 25 is transferred to a respective one of the releasing devices 40, 41, 42, 43 and 44. The authorization code AUC transferred is then processed in the releasing device 40, 41, 42, 43 or 44, in which case a check is also performed, after which, i.e. after the read-out of the authorization code AUC by the relevant reading device 21, 22, 23, 24 or 25 and after the checking of the authorization code AUC, a release takes place of the communication means 10, 13, 14, 15 and 16 that are connected to respective ones of the releasing means 40, 41, 42, 43 and 44 and that are controllable thereby, thus releasing the communication devices 4, 5, 6, 7 and 8 containing the respective communication means 10, 13, 14, 15 and 16 for communication with another of the communication devices.

In what follows, there will be described a method of releasing communication between the first communication device 4 and two further communication devices 5 and 8 that can be performed using the configuration 1 shown in FIG. 1.

It is assumed that the first communication device 4, i.e. the image projecting device 4, is already present in the room 2. The further communication devices 5, 6, 7 and 8 are brought into the room 2 by their respective users, the room 2 forming an area that allows direct communication between the communication devices 4, 5, 6, 7 and 8. In this way, communication can take place between the total of five communication devices 4, 5, 6, 7 and 8 directly, namely via the network 9.

To release communication between the first communication device 4 and the further two communication devices 5 and 8, use is made of the single data carrier 36, which is brought into successive non-contacting read connection with the respective reading devices 21, 22 and 25 of the communication devices 4, 5 and 8 that are to be released for communication with one another.

The data carrier 36 is for example brought first into the vicinity of the first communication device 4, and as a result the authorization code AUC is read out from the data carrier 36 by the reading device 21. The data carrier 36 is then brought into the vicinity of the first further communication device 5, and as a result the authorization code AUC is read out from the data carrier 36 by the reading device 22. Consequently, the releasing devices 40 and 41 that cooperate with the reading devices 21 and 22 analyze the authorization code AUC and exchange and check it by means of the communication means 10 and 17, after which, if the result of the check is positive, the releasing devices 40 and 41 release communication between the first communication device 4 and the first further communication device 5, which means that the transmission of data or data signals from the first further communication device 5 to the first communication device 4 is then released and performed. What is achieved in this way is that data contained in the first further communication device 5 is transmitted over the network 9 to the first communication device 4, after which the data transmitted is then reproduced optically.

It is ensured in this case, as a result of the use of the data carrier 36 containing the authorization code AUC and the processing of the authorization code AUC read out in the first communication device 4 and in the first further communication device 5, that only these two communication devices 4 and 5 are able to communicate with one another, whereas all the other further communication devices 6, 7 and 8 present in the room 2 are barred from communicating with the first communication device 4 and the first further communication device 5. Once a desired data transmission from the first further communication device 5 to the first communication device 4 has been completed, which is done deliberately by a user of the further communication device 5, the data carrier 36 is brought, in the present example, into the vicinity of the fourth further communication device 8, which means that the authorization code AUC contained in the data carrier 36 is then read out by means of the reading device 25 which, in an entirely similar way to that described above, results in communication between the fourth further communication device 8 and the first communication device 4 being released.

It is of course also possible for communication to be released between two other further communication devices, by for example first bringing the data carrier 36 into the vicinity of the second further communication device 6 and then into the vicinity of the third further communication device 7, which will then, in the end, result in communication being released between these two communication devices 6 and 7.

Because the authorization code AUC is stored in the data carrier 36 in a very secure way, the reason for this being that a data carrier of this kind has a series of access barriers and the authorization code AUC is also stored in an encrypted and hence highly secure manner, it is ensured by means of the data carrier 36 that a very high level of security is guaranteed for the release of communication between at least two communication devices.

Figure 2:
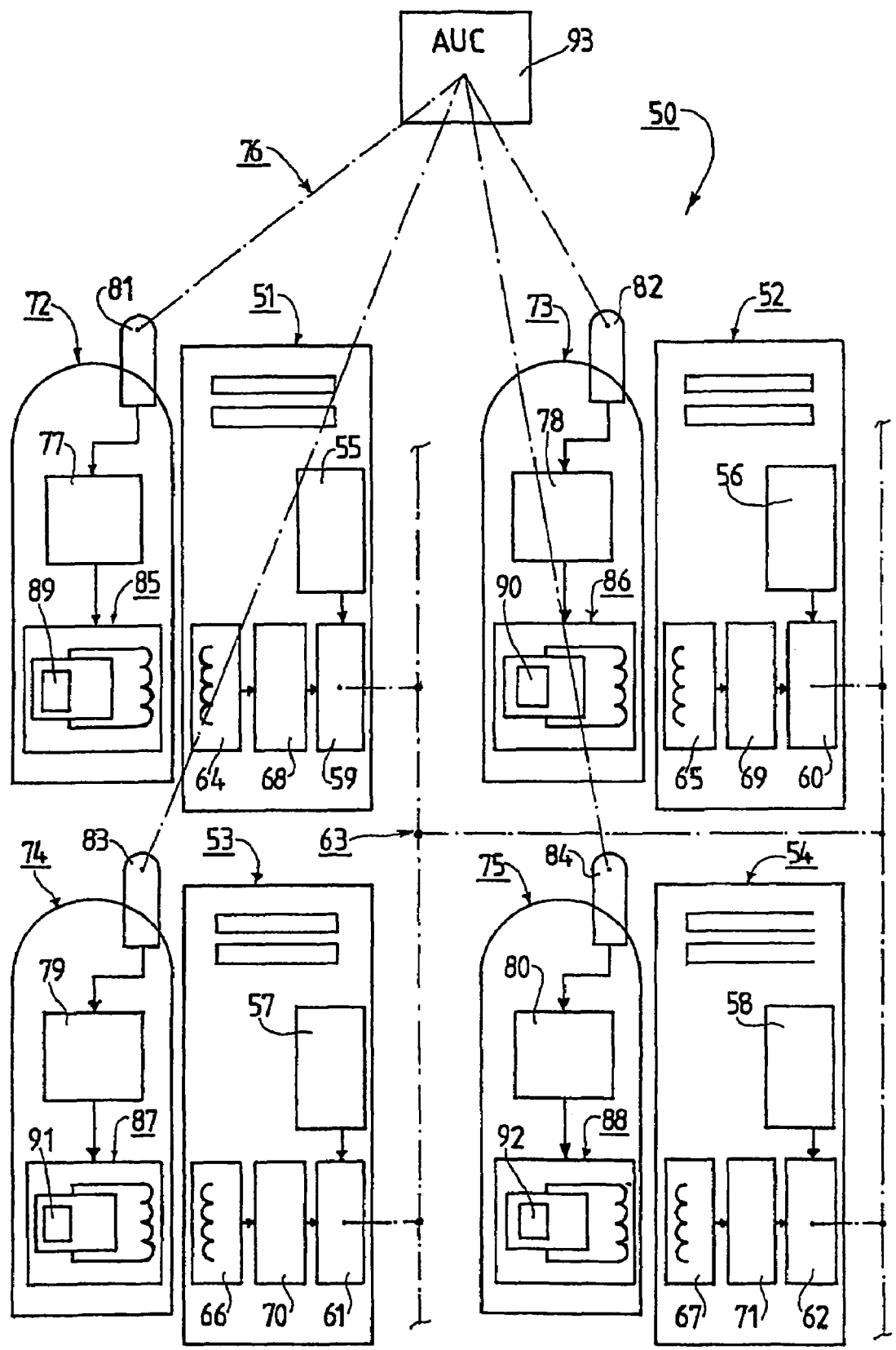
FIG. 2 is a view similar to FIG. 1 of a second configuration of communication devices according to the invention.

Shown in FIG. 2 is a configuration 50 that in this case has four communication devices 51, 52, 53 and 54. The four communication devices 51, 52, 53 and 54 are so-called desktop computers. The communication devices 51, 52, 53 and 54 contain respective data-processing means 55, 56, 57 and 58. The communication devices 51, 52, 53 and 54 also contain respective communication means 59, 60, 61 and 62 that are connected to respective data-processing means 55, 56, 57 and 58. By means of the communication means 59, 60, 61 and 62 the communication devices 51, 52, 53 and 54 are connected to a diagrammatically indicated data network 63, that is to say to the so-called internet in the present case. This could though be some other data network, such as a so-called intranet for example.

The communication devices 51, 52, 53 and 54 contain respective reading devices 64, 65, 66 and 67 able to read in a non-contacting manner, to which respective releasing devices 68, 69, 70 and 71 are connected. The releasing devices 68, 69, 70 and 71 are connected to respective ones of the communication means 59, 60, 61 and 62 in the respective communication devices 51, 52, 53 and 54. In this case too the reading devices 64, 65, 66 and 67 are arranged and intended for the non-contacting read-out of an authorization code AUC from a memory belonging to a data carrier. The releasing devices 68, 69, 70 and 71 are arranged and intended for releasing respective ones of the communication means 59, 60, 61 and 62, and hence respective ones of the communication devices 51, 52, 53 and 54, for communication with another communication device. In the configuration shown in FIG. 2, the communication devices 51, 52, 53 and 54 that are to be released for communication with one another are divided up into a plurality of areas that do not allow direct communication between the communication devices 51, 52, 53 and 54, which means that communication between the communication devices 51, 52, 53 and 54 is possible only indirectly via a first transmission channel, this first transmission channel being formed by the data network 63, i.e. by the internet.

In the configuration 50 shown in FIG. 2, each of the communication devices 51, 52, 53 and 54 to be released for communication has a separate data carrier associated with it, for which purpose the solution described below is intended. In the configuration 50, the communication devices 51, 52, 53 and 54 have respective mobile telephones 72, 73, 74 and 75 associated with them. The mobile telephones 72, 73, 74 and 75 can be connected together for communication purposes by means of a mobile telephone network 76, which mobile telephone network 76 represents a second transmission channel.

The mobile telephones 72, 73, 74 and 75 contain respective signal-processing means 77, 78, 79 and 80 that are intended and arranged to process signals that are received by the respective mobile telephones 72, 73, 74 and 75 by means of respective antennas 81, 82, 83 and 84.

The mobile telephones 72, 73, 74 and 75 also contain respective data carriers 85, 86, 87 and 88 or data carrier circuits. The data carriers 85, 86, 87 and 88 are connected to respective ones of the signal-processing circuits 77, 78, 79 and 80 and contain respective memories 89, 90, 91 and 92 for storing an authorization code AUC. The data carriers 85, 86, 87 and 88 in the respective mobile telephones 72, 73, 74 and 75 can be brought into non-contacting read connection with the respective reading devices 64, 65, 66 and 67 of communication devices 51, 52, 53 and 54 associated with respective mobile telephones 72, 73, 74 and 75, thus enabling the authorization code AUC stored in the respective memories 89, 90, 91 and 92 to be read out and transferred to the respective communication devices 51, 52, 53 and 54 once a non-contacting read connection of this kind has been made.

In the configuration 50 shown in FIG. 2, the authorization code AUC can be transmitted from a central point 93 over the mobile telephone network 76 to each mobile telephone 72, 73, 74 or 75 and can be processed by the signal-processing circuits 77, 78, 79 and 80 and can then be stored in each of the data carriers 85, 86, 87 and 88 housed in the mobile telephones 72, 73, 74 and 75. Following such transmission of the authorization code AUC to the mobile telephones 72, 73, 74 and 75, each such mobile telephone 72, 73, 74 or 75 can be brought into the vicinity of the communication device 51, 52, 53 or 54 associated with the given mobile telephone 72, 73, 74 or 75, by which means it is then possible for the authorization code AUC to be read out, thus enabling, after such read-out of the authorization code AUC and processing and checking of the authorization code AUC, release of communication among the four communication devices 51, 52, 53 or 54 to be performed in the relevant releasing device 68, 69, 70 or 71.

In the configuration 50 shown in FIG. 2, an authorization code AUC is distributed to a plurality of data carriers 85, 86, 87 and 88 that can be read from in a non-contacting manner, a mobile telephone network 76 different than the data network 63 being used for the transmission of the authorization code AUC to the separate data carriers 85, 86, 87 and 88, by which means high security is obtained for the release of communication among the communication devices 51, 52, 53 and 54 over the data network 63.

The invention claimed is:

1. A method of releasing communication between at least two communication devices that are arranged to communicate with one another, wherein a data carrier that is able to be read from in a non-contacting manner and that contains an authorization code is brought into the vicinity of at least two such communication devices and in this way the data carrier that is brought into the vicinity of a given communication device is brought into non-contacting read connection with a reading device that is connected to the given communication device and can be read in a non-contacting manner, wherein the authorization code is read out by each reading device from the data carrier that is in non-contacting read connection with the reading device, wherein a check is performed on the authorization code read out, and wherein the communication devices by whose reading devices the authorization code was read out from the data carrier are released for communication with one another once the authorization code has been read out from the data carrier, the authorization code read out has been checked and a positive result has been received for the check.

2. A method as claimed in claim 1, wherein the communication devices are brought into an area that allows direct communication between the communication devices, thus enabling communication to take place between the communication devices directly, and wherein a single data carrier is used to release all the communication devices that are to be released for communication with one another, which data carrier is brought, in succession, into non-contacting read connection with each of the reading devices of the communication devices that are to be released for communication with one another.

3. A method as claimed in claim 1, wherein the communication devices to be released for communication with one another are divided up into a plurality of areas that do not allow direct communication between the communication devices, which means that communication between the communication devices is possible only indirectly via a first transmission channel wherein each communication device to be released for communication is associated with a separate data carrier and wherein the authorization code is transmitted to each separate data carrier.

4. A method as claimed in claim 3, wherein the transmission of the authorization code to the separate data carriers is performed over a second transmission channel different than the first transmission channel.

5. A method as claimed in claim 4, wherein data carriers each housed in a mobile telephone are used as the separate data carriers.

6. A communication device that is arranged and intended to communicate with another communication device arranged to be suitable for this purpose and that has a reading device able to read in a non-contacting manner from a data carrier that is able to be read from in a non-contacting manner and that contains an authorization code that can be brought into non-contacting read connection of at least the two such communication devices when brought into the vicinity of each of the communication devices, by which reading device the authorization code contained in the data carrier can be read out, which communication device has a releasing device that cooperates with the reading device and that is arranged and intended to release the communication device for communication with another communication device once the authorization code has been read out by the reading device, and the authorization code has been checked and the result of the check is positive.

7. A method of releasing for communication selected of a plurality of communication devices, the method employing at least one data carrier that is readable in a non-contacting manner and that contains an authorization code associated with releasing communication, the method comprising:
   establishing connection between a data carrier and at least one communication device for the purpose of non-contacting read of the data carrier by the at least one communication device;
   reading the authorization code from the data carrier in a non-contacting manner by the at least one communication device when the data carrier is brought within the vicinity of the communication device; and
   checking the authorization code and when a positive result is received for the check, releasing for communication the at least one communication device.

8. The method of claim 7, wherein establishing connection comprises providing a selected vicinity between the data carrier and the at least one communication device.

9. The method of claim 8, wherein providing a selected vicinity comprises providing a vicinity of sufficient physical proximity so as to support reading the data carrier via inductive coupling.

10. The method of claim 7, wherein reading the authorization code comprises using a reading device associated with the at least one communication device.

11. The method of claim 10, wherein establishing connection comprises establishing connection between the reading device and the data carrier.

12. The method of claim 10, wherein the reading device is integral with the at least one communication device.

13. The method of claim 10, wherein the reading device is provided in a second device physically separate from the at least one communication device.

14. The method of claim 7, wherein reading the authorization code comprises reading via inductive coupling.

15. The method of claim 7, further comprising, responsive to processing the authorization code, determining whether to release for communication the at least one communication device.

16. The method of claim 7, further comprising:
   establishing connection between a data carrier and at least another communication device for the purpose of non-contacting read of the data carrier by the at least another communication device;
   reading the authorization code from the data carrier in a non-contacting manner by the at least another communication device; and
   processing the authorization code, in connection with releasing for communication the at least another communication device.

17. The method of claim 16, wherein establishing connections comprise using a single data carrier as to both the at least one communication device and the at least another communication device.

18. The method of claim 17, wherein at least one of processing the authorization codes comprises exchanging in at least one of the following manners: (i) transferring the authorization code read by the at least one communication device to the at least another communication device; (ii) transferring the authorization code read by the at least another communication device to the at least one communication device; and (iii) mutually transferring the respective authorization code read by the at least one communication device and the at least another communication device from each to the other.

19. The method of claim 18, further comprising, responsive as to at least one of processing authorization codes, determining whether to release from communication with one another at least one of the at least one communication device and the at least another communication device.

20. The method of claim 16, wherein establishing connections comprise using plural data carriers, such data carriers being in one-to-one association with the at least one communication device and the at least another communication device, and further comprising a transmission channel by which each of the plural data carriers receives its authorization code associated with releasing for communication with one another the at least one communication device and the at least another communication device.

* * * * *